United States Patent
Michini et al.

(10) Patent No.: US 9,835,453 B2
(45) Date of Patent: Dec. 5, 2017

(54) GROUND CONTROL POINT ASSIGNMENT AND DETERMINATION SYSTEM

(71) Applicant: Unmanned Innovation, Inc., San Francisco, CA (US)

(72) Inventors: Bernard J. Michini, San Francisco, CA (US); Brett Michael Bethke, Millbrae, CA (US); Fabien Blanc-Paques, San Francisco, CA (US)

(73) Assignee: UNMANNED INNOVATION, INC., San Francisco, CA (US)

( * ) Notice: Subject to any disclaimer, the term of this patent is extended or adjusted under 35 U.S.C. 154(b) by 0 days.

(21) Appl. No.: 15/336,569

(22) Filed: Oct. 27, 2016

(65) Prior Publication Data

US 2017/0259912 A1    Sep. 14, 2017

Related U.S. Application Data

(63) Continuation of application No. 15/093,511, filed on Apr. 7, 2016.

(Continued)

(51) Int. Cl.
*G01C 15/06* (2006.01)
*G05D 1/00* (2006.01)

(52) U.S. Cl.
CPC ........... *G01C 15/06* (2013.01); *G05D 1/0011* (2013.01); *B64C 2201/123* (2013.01); *B64C 2201/128* (2013.01); *B64C 2201/146* (2013.01)

(58) Field of Classification Search
CPC ........ B64C 39/04; G08G 5/003; G05D 1/011; G01C 15/02; G01C 15/06
See application file for complete search history.

(56) References Cited

U.S. PATENT DOCUMENTS 5,825,298 A    10/1998    Walter
5,951,346 A     9/1999    Woodall
(Continued)

FOREIGN PATENT DOCUMENTS

WO    WO 2017/024358 A1    2/2017

OTHER PUBLICATIONS

R. Loemker, "Aeropoint—transportable automated ground points with RTK," UAV Coach Community Forum, http://community.uavcoach.com/topic/392-aeropoint-transportable%C2%A0automated-ground-points-with-rtk/, Mar. 7, 2016.*

(Continued)

*Primary Examiner* — Thomas G Black
*Assistant Examiner* — Peter D Nolan
(74) *Attorney, Agent, or Firm* — Knobbe Martens Olson & Bear LLP

(57) ABSTRACT

Methods, systems, and apparatus, including computer programs encoded on computer storage media, for ground control point assignment and determination. One of the methods includes receiving information describing a flight plan for the UAV to implement, the flight plan identifying one or more waypoints associated with geographic locations assigned as ground control points. A first waypoint identified in the flight plan is traveled to, and an action to designate a surface at the associated geographic location is designated as a ground control point. Location information associated with the designated surface is stored. The stored location information is provided to an outside system for storage.

21 Claims, 10 Drawing Sheets

Related U.S. Application Data

(60) Provisional application No. 62/305,428, filed on Mar. 8, 2016.

(56) References Cited

U.S. PATENT DOCUMENTS

| | | | |
|---|---|---|---|
| 6,175,328 B1 * | 1/2001 | Ericsson | G01C 15/00 342/357.31 |
| 6,437,708 B1 | 8/2002 | Brouwer | |
| 6,585,133 B1 | 7/2003 | Brouwer | |
| 6,944,096 B2 * | 9/2005 | Lemenager | G01V 1/16 367/76 |
| 7,640,105 B2 | 12/2009 | Nielsen et al. | |
| 8,527,115 B2 | 9/2013 | Greenfeld et al. | |
| 8,717,361 B2 | 5/2014 | Sasakawa et al. | |
| 8,965,700 B2 | 2/2015 | Nielsen et al. | |
| 9,075,415 B2 | 7/2015 | Kugelmass | |
| 9,256,225 B2 | 2/2016 | Downey et al. | |
| 9,256,994 B2 | 2/2016 | Downey et al. | |
| 9,273,981 B1 | 3/2016 | Downey et al. | |
| 9,310,221 B1 | 4/2016 | Downey et al. | |
| 9,311,760 B2 | 4/2016 | Downey et al. | |
| 9,340,283 B1 | 5/2016 | Downey et al. | |
| 9,403,593 B2 | 8/2016 | Downey et al. | |
| 9,406,237 B2 | 8/2016 | Downey et al. | |
| 9,592,912 B1 | 3/2017 | Michini et al. | |
| 2005/0010361 A1 * | 1/2005 | Runkel | G01S 19/07 701/469 |
| 2006/0215494 A1 | 9/2006 | Thomas | |
| 2007/0126579 A1 | 6/2007 | Adams et al. | |
| 2007/0222640 A1 * | 9/2007 | Guelzow, II | G08B 5/006 340/908 |
| 2008/0002858 A1 * | 1/2008 | Devir | G01C 11/02 382/109 |
| 2008/0036652 A1 | 2/2008 | Shore et al. | |
| 2009/0045290 A1 | 2/2009 | Small et al. | |
| 2009/0074254 A1 | 3/2009 | Jamison et al. | |
| 2010/0295699 A1 | 11/2010 | Rushing | |
| 2011/0000095 A1 * | 1/2011 | Carlson | G01C 15/00 33/275 R |
| 2011/0035149 A1 | 2/2011 | Mcandrew et al. | |
| 2011/0045175 A1 | 2/2011 | Nielsen et al. | |
| 2011/0137547 A1 | 6/2011 | Kwon et al. | |
| 2011/0282578 A1 * | 11/2011 | Miksa | G06F 17/30241 701/532 |
| 2012/0218088 A1 | 8/2012 | Bauchot et al. | |
| 2013/0105635 A1 | 5/2013 | Alzu'bi et al. | |
| 2014/0163775 A1 | 6/2014 | Metzler | |
| 2015/0032295 A1 | 1/2015 | Stark et al. | |
| 2015/0192928 A1 | 7/2015 | Sastre | |
| 2015/0261217 A1 | 9/2015 | Gil | |
| 2015/0321758 A1 | 11/2015 | Sarna | |
| 2016/0023761 A1 | 1/2016 | McNally | |
| 2016/0070001 A1 * | 3/2016 | Krantz | H01Q 1/362 342/357.72 |

OTHER PUBLICATIONS

J. Kuze, "Ground Control Points (GCPs) for aerial photography" DIY DRONES, http://diydrones.com/profiles/blogs/ground-control-points-gcps-for-aerial-photography?xg_source=activity, Feb. 2, 2015.*

International Search Report and Written Opinion of the International Searching Authority Issued for International Application No. PCT/US2017/021217 dated May 26, 2017, 17 pages.

* cited by examiner

GROUND CONTROL POINT ASSIGNMENT AND DETERMINATION SYSTEM

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Ground Control Points (GCPs) are used in the generation of the ortho-rectified imagery, for instance, acting as tie points in images that tie the images to a real-world coordinate frame (e.g., the surface of the Earth). To generate ortho-rectified imagery from a collection of images that are to be combined (e.g., stitched) together, GCPs need to be visible within the collection of images, along with highly accurate location information for each GCP. Generally, to collect this location information, a person can travel a desired location and set-up a tripod system that includes a survey grade GNSS (e.g., GPS) receiver, and visually mark a physical area associated with the GCP. Location information (e.g., coordinates) associated with the GNSS receiver at the physical area are obtained, and stored for use as a GCP.

SUMMARY

In general, one optional innovative aspect of the subject matter described in this specification can be embodied in methods that include the actions of receiving information describing a flight plan for the UAV to implement, the flight plan identifying one or more waypoints associated with geographic locations assigned as ground control points; traveling to a first waypoint identified in the flight plan, and performing an action to designate a surface at the associated geographic location as a ground control point; storing location information associated with the designated surface; and providing the stored location information to an outside system for storage.

Particular embodiments of the subject matter described can be implemented so as to realize one or more of the following advantages. Ground Control Points (GCPs) can be assigned to geographic locations, and each geographic location can, with limited human interaction, be prepared for later identification as a GCP, along with the accurate gathering of location information (e.g., GNSS coordinates) of the GCP. For instance, in contrast to a person spending hours, or days, traveling to each geographic location assigned as a GCP, obtaining location information and preparing the location to act as a GCP (e.g., visibly marking the location), an unmanned aerial vehicle (UAV) can rapidly travel to each geographic location and automatically prepare the location to act as a GCP. For instance, an unmanned aerial vehicle (UAV) can travel to a particular geographic location, perform an operation, action, at the geographic location (e.g., spray-paint a biodegradable mark on the ground, drop a known visually identifiable marker on the ground, and so on) to identify the geographic location as a ground control point, and record a location of the geographic location (e.g., a centroid of the mark or known object). Afterwards, another, or the same, unmanned aerial vehicle can perform a flight plan, such as a job to inspect property, or a structure, for damage, and can gather images during the flight plan that include the GCP. In this way, a large increase in time-savings can be obtained by drastically reducing the preparation time that is generally necessary for a person to perform prior to a UAV performing a flight plan. For particular geographic locations, conventional techniques to prepare the geographic locations to act as GCPs can be dangerous for persons involved in the preparation. For example, GCPs placed near mines or quarries can require people to be located near cliffs, dangerous equipment, and so on. This can negate the possibility, or increase costs and difficulty, of preparing these geographic locations, and can violate safety protocols of a governmental entity or a corporate entity. Using the techniques described herein, geographic locations can be prepared as GCPs without placing people in harm's way, enabling a much broader range of geographic locations to be utilized.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
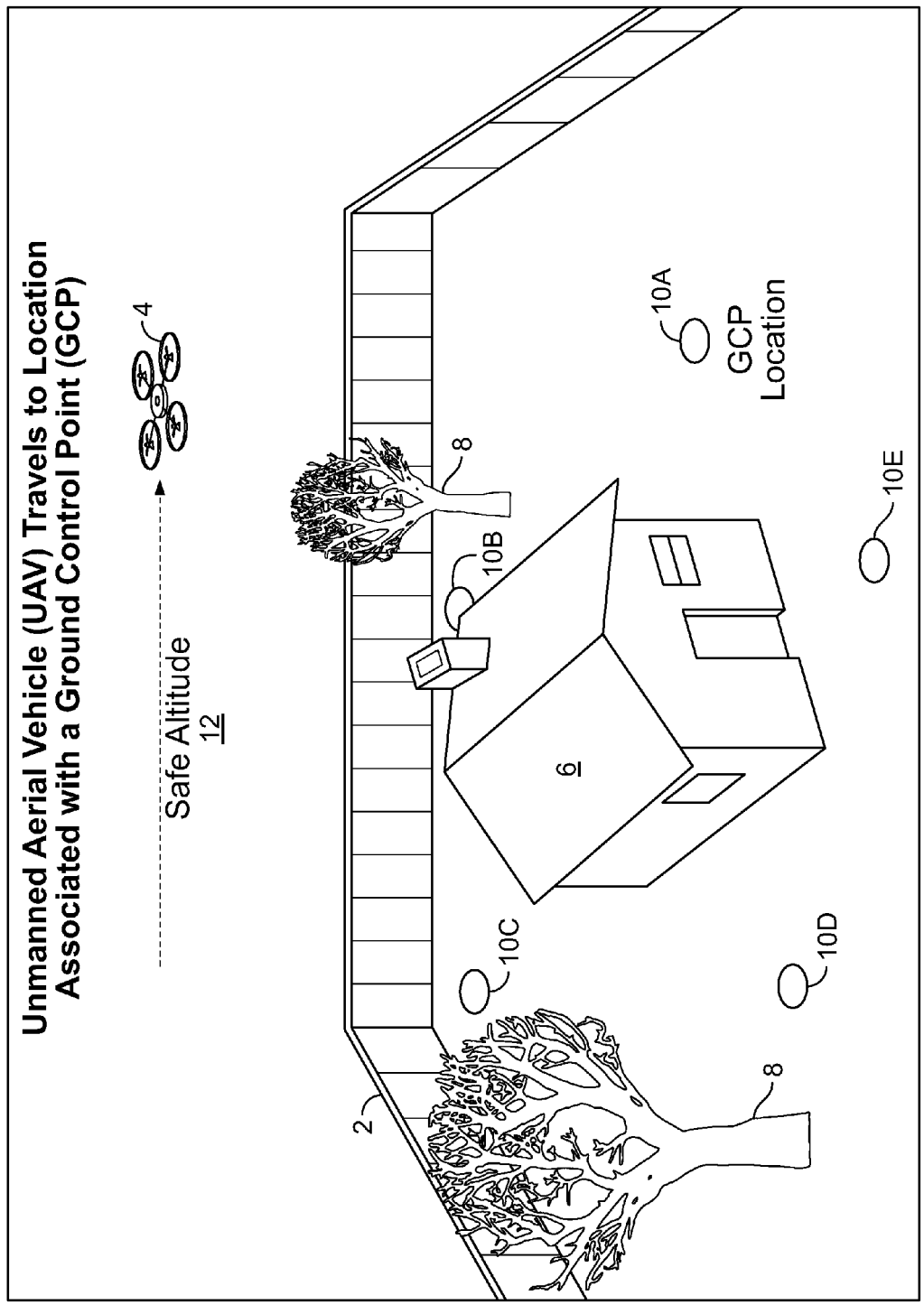
FIG. 1A illustrates an example diagram of an unmanned aerial vehicle (UAV) traveling to a geographic location assigned as a ground control point (GCP).

Among other features, this specification describes systems and methods utilized for assigning geographic locations to act as ground control points (GCPs), and causing each geographic location to be prepared for use as a GCP including, recording sensor information (e.g., imagery) sufficient to later identify the geographic area (e.g., unique features of the area such as a manhole cover) or marking the area (e.g., spray-painting the area or dropping a marker on the area), and recording geographic location information of the geographic area (e.g., GNSS coordinates such as GPS coordinates). In this specification, a ground control point is an accurately surveyed geographic location in a real-world area that can be identified in imagery that includes the geographic location. The imagery can be combined (e.g., stitched together by a photogrammetry system) and placed in a real-world coordinate frame using the accurately surveyed location information (e.g., GPS coordinates) associated with each GCP identifiable in the imagery.

As will be described, an unmanned aerial vehicle (UAV) can include, or be otherwise connected with, a GNSS receiver, such as a GPS receiver, a Real Time Kinetic (RTK) receiver in communication with GNSS satellites and a ground-based receiver located within a threshold distance, a Post Processing Kinetic receiver, and so on. The UAV can receive a flight plan generated by a system (e.g., a cloud system as described below) in communication with the UAV, or a user device (e.g., a device) of an operator acting in concert with the UAV, that indicates one or more waypoints (e.g., geographic locations) assigned as GCPs (e.g., indicated by a user of the system). The UAV can travel to each waypoint, perform an action (e.g., an operation) at the waypoint, such as marking the waypoint, and record precise geographic location information at the waypoint (e.g., at a centroid of a marked area).

A user of the system can utilize one or more user interfaces to assign GCPs to geographic locations, and the system can generate a flight plan for the UAV to implement. For instance, as will be described below with reference to FIG. 2, the system can receive an identification of a geographic area, such as a city block, a house address, geographic coordinates, and so on, and present imagery (e.g., satellite imagery) of the identified geographic area. Within the presented user interface, the user can select points within the imagery to be assigned as GCPs (e.g., the user can press on a particular portion of a touch-sensitive screen, mouse-click, and so on). To ensure that the GCPs encompass the identified geographic area, and specifically sufficiently encompass a geographic area that will be utilized in a subsequent UAV flight plan to perform a job (e.g., a flight plan to inspect for damage of the geographic area), the system can present information describing the subsequent flight plan, including waypoints the UAV is to travel to, altitudes at which the UAV is to travel, actions the UAV is to take at each waypoint (e.g., capture imagery), and so on. In this way, the user can view a flight plan for an intended use of the UAV, to perform a job such as inspecting a property or structure for damage, and ensure that GCPs are proximate to the flight plan so as to be included in imagery captured by the UAV while performing the job.

In this specification, UAVs include any unmanned aerial vehicles, such as drones, unpiloted aerial vehicles, remotely piloted aircraft, unmanned aircraft systems, any aircraft covered under Circular 328 AN/190 classified by the International Civil Aviation Organization, and so on. For example, various types of UAVs may be used to implement the inventions described herein (for example, a fixed wing airplane, helicopter, a multi-rotor vehicle (e.g., a quad-copter in single propeller and coaxial configurations), a vertical take-off and landing vehicle, lighter than air aircraft). A multi-rotor vehicle in a coaxial configuration may use the same propeller pitch and diameter propellers, use different pitch and diameter propellers, or variable pitch propellers. In addition, certain aspects of the disclosure can be utilized with other types of unmanned vehicles (e.g., wheeled, tracked, and/or water vehicles). Specifically, an unmanned vehicle (e.g., a ground based vehicle, such as a rover) can be utilized to prepare a geographic location as a ground control point (e.g., described below with respect to FIG. 1C).

FIG. 1A illustrates an example diagram of an unmanned aerial vehicle (UAV) 4 traveling to a geographic location assigned as a ground control point (GCP) 10A. FIG. 1A includes an inspection area 2 at which a UAV (e.g., the UAV 4, or a different UAV) is to perform a job (e.g., identifying and characterizing damage in the inspection area 2, such as damage to a rooftop of a house 6). To ensure that imagery captured during the job can be combined (e.g., stitched together) to generate geo-rectified or ortho-rectified imagery, GCPs (e.g., GCPs 10A-10E) have been assigned (e.g., as described in FIG. 2) proximate to, or within, the inspection area 2 to ensure that they are included in the imagery captured while the UAV performs the job. While the GCP assignment is explained via an auto-piloted flight plan, the UAV may also be flown manually to a location, and then an action triggered using a user device to obtain a ground control point.

Prior to performance of the job, the UAV 4 travels according to a generated flight plan (e.g., described in FIG. 2) that identifies waypoints (e.g., coordinates of each waypoint, such as longitude and latitude) for the UAV 4 to travel to, with each waypoint associated with a GCP. Optionally, the flight plan can include a particular speed at which the UAV is to travel between waypoints. As will be described in FIG. 1B, upon reaching vertically above a GCP location (e.g., GCP location 10A) at the safe altitude 12, the UAV 4 descends towards the surface (e.g., ground) on which the GCP was assigned, and performs an action to designate the surface as a GCP, along with obtaining location information of the designated surface. For instance, the UAV 4 can spray a biodegradable fluid (e.g., paint, foam, and so on) on the surface at the GCP location 10A to designate the location 10A as a GCP (e.g., mark the surface of the location 10A so its visible in imagery), and obtain geospatial location information at a centroid of the marked surface. In this way, while a UAV is performing a job (e.g., a job to inspect damage of a rooftop of the house 6), the UAV can capture imagery that includes the created GCPs, each with associated accurate location information.

As illustrated, the UAV 4 is traveling at a particular altitude (e.g., safe altitude 12) to GCP location 10A. The safe altitude 12 indicates an altitude at which the UAV 4 can safely travel (e.g., free of obstructions) within the inspection area 2, or within a geofence identifying allowable locations of the UAV within a real-world geographic area or volume, and which can be indicated by a user in a flight plan (e.g., as will be described in FIG. 2). For instance, the inspection area 2 includes a house 6 and trees 8, which can interfere with the UAV's 4 safe trajectory as it travels to the GCP location 10A. Therefore, a user generating a flight plan to travel to indicated GCPs can designate the safe altitude 12 (e.g., using satellite imagery of the inspection area 2, 3D models of the inspection area, and so on). Optionally, the UAV 4 can be equipped with sensors (e.g., distance sensors, visual cameras) to actively monitor and detect upcoming obstructions such that no safe altitude 12 is needed.

The GCPs (e.g., GCPs 10A-10E) are arranged surrounding the house 6, and can be arranged at particular angles surrounding the house 6 (e.g., 30 degrees, 45 degrees, 72 degrees, and so on), which a user can select depending on the particulars of a flight plan to perform the job. For instance, subsequent to traveling to each GCP, a UAV can perform a job to inspect the rooftop of the house 6 for damage, and depending on the flight pattern the UAV will follow, the user can prefer to place more or less GCPs proximate to the house 6 to ensure that at least one GCP will be included in images captured while inspecting the rooftop.

The user can place more GCPs proximate to a geographic area, structure, and so on, that is being inspected in a subsequent job, and less GCPs proximate to areas that are not under inspection or where accuracy is less important. In this way, the user can assign more GCPs to be located near geographic areas the user is interested in, and can thus set a variable accuracy when generating geo-rectified imagery obtained during performance of the job (e.g., areas with more GCPs will have more accurate location information).

Optionally, a nearby operator (e.g., a human operator in wireless communication with the UAV 4 utilizing a user device) can modify one or more geographic locations assigned as GCPs. For instance, the operator can visually determine that, for example, GCP location 10D is within a threshold distance of a tree 12, and can modify the GCP location 10D to be further from the tree 12. As an example, the operator's user device can present imagery (e.g., satellite imagery) of the inspection area 12, and the operator can interact with the imagery to assign a different geographic location as an updated GCP location 10D. An example user interface for assigning geographic locations as GCPs is described below, with respect to FIG. 2.

Figure 1B:
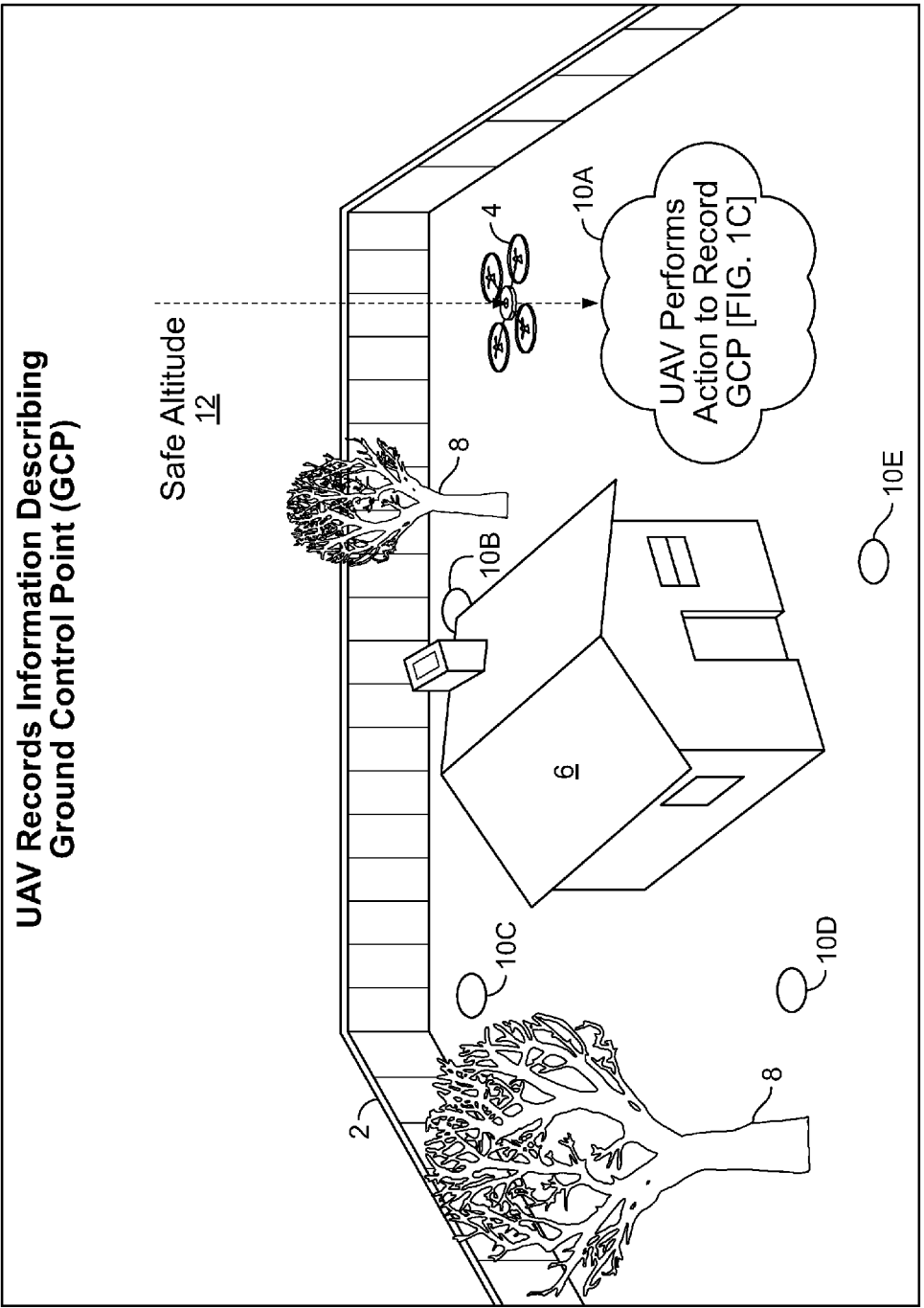
FIG. 1B illustrates an example diagram of the UAV descending towards a geographic location assigned as GCP.

FIG. 1B illustrates an example diagram of the UAV 4 descending towards a geographic location assigned as GCP 10A. As illustrated, the UAV 4 has traveled to the GCP location 10A at the safe altitude 12, and is ready to descend towards the surface (e.g., the ground) to perform an action to designate the geographic location as a GCP, and obtain location information of the designated geographic location. Performing an action to designate a geographic location as being a GCP (e.g., marking the location, recording unique identifiable features of the geographic location), and obtaining location information, are described further below, with reference to FIG. 1C.

Optionally, the UAV 4 can travel to a location vertically above the GCP location 10A, and hover until receiving confirmation from a nearby operator (e.g., a human operator utilizing a user device in wireless communication with the UAV 4) to descend. In this way, the operator can have control over the UAV 4 as it removes itself from the safety of the safe altitude 12, and descends towards potential obstacles and human population. Additionally, as the UAV 4 descends it might travel out of view of the operator (e.g., behind the house 6), and the operator can provide confirmation for the UAV 4 to descend upon the operator moving to a different location that affords constant line-of-sight with the UAV 4.

The UAV 4 descends until reaching a threshold distance above the surface (e.g., ground), with the threshold distance being based on a specific action the UAV is to perform. Optionally, the UAV 4 can descend and land on the surface. As will be described in FIG. 2, a user can assign geographic locations as being GCPs for the UAV 4 to travel to, and can indicate specific types of actions the UAV 4 is to perform to designate each geographic location as a GCP. For instance, the user can indicate that the UAV 4 is to spray a fluid (e.g., a visible fluid) on the geographic location (e.g., create a sprayed circular area on the geographic location), or that the UAV 4 is to carry and deposit (e.g., place, or drop from a distance) a marker (e.g., an object of a known shape that can be identified, or that the marker has patterns displayed on the marker), or that the UAV 4 is to obtain detailed imagery of the geographic location for later use in identifying the geographic location within captured imagery (e.g., certain geographic locations can include unique features, or capture imagery of sufficient detail, such that the features can be identified in later captured images).

For an action to spray a fluid at the geographic location, the UAV 4 can descend to a threshold distance above the surface at which it can manipulate a fluid spraying system to spray the surface with a known shape. For instance, the UAV 4 can hover at the threshold distance and manipulate a fluid spraying system to spray a circle or sphere of a particular radius. Additionally, for an action to deposit a marker, the UAV 4 can optionally land on the surface, place the marker, and ascend upwards. Alternatively, for the action to deposit the marker, the UAV 4 can descend to a threshold distance above the surface (e.g., a distance sufficiently close to the surface such that the marker falls straight to the surface without movement during descent or upon landing), and then drop the marker. Ideally the fluid sprayed is biodegradable and non-toxic to humans, animals and plants.

Figure 1C:
FIG. 1C illustrates example embodiments of a UAV performing actions to designate a geographic location as a GCP and obtain location information associated with the designated geographic location.
Figure 1C:
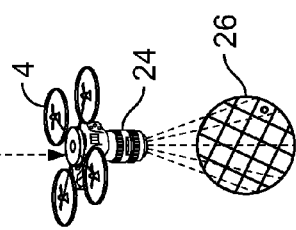

FIG. 1C illustrates example embodiments of a UAV performing actions (e.g., operations) to designate a geographic location as a GCP and obtain location information associated with the designated geographic location. As described above, each action illustrated in FIG. 1C can be selected by a user generating a flight plan to assign GCPs to geographic locations, and can be provided to a UAV to implement. The selections can depend on capabilities and configuration information of the UAV, for instance whether the UAV can spray a fluid, can drop a marker, and so on.

A first embodiment illustrates the UAV 4 creating an identifiable mark on a surface (e.g., ground) at a geographic location to designate the location as GCP. As illustrated, the UAV 4 is spraying a fluid 20 (e.g., paint, such as biodegradable visible, infrared, ultraviolet, paint of a particular color, foam, string, and so on) on the surface to create a marked area (e.g., circular, or any arbitrary polygon shape). The UAV 4 creates the identifiable mark while hovering at a threshold distance above the surface, and can create the mark utilizing a spray nozzle, or other fluid spray system, connected, or included in, the UAV 4. For instance, the UAV 4 can create a circular mark by rotating the spray nozzle in a circular fashion). In this way, a centroid of the created mark can be identified as being vertically down from the spray nozzle. Alternatively, the UAV 4 can spray the fluid in a direction partially horizontally from the UAV 4, and as will be described, can determine a centroid of the created mark by moving horizontally to the centroid. Other shapes and patterns may be created, for example, x-pattern, cross-hatched, etc. Additionally, the identifiable mark may be created with multiple colors, for example, a white sold circle, with a bright orange inner circle.

After creating the identifiable mark, the UAV 4 obtains location information at a centroid of the created mark. The UAV 4 can obtain an offset (e.g., horizontal distance) from a GNSS receiver to the spray nozzle, and can utilize this offset to accurate determine location information (e.g., longitude and latitude coordinates) of the centroid of the created mark. Additionally, the UAV 4 can capture imagery of the created mark, and determine a centroid of the mark using computer vision techniques. For instance, the UAV 4, or a user device in wireless communication with the UAV 4, can obtain imagery of the created mark, identify boundaries of the mark (e.g., identify an edge of the mark), and determine a centroid inside the boundaries. To determine location information, the UAV 4 can position a center of the camera vertically over the centroid and obtain location information (e.g., coordinates) at the centroid, or the UAV 4 can utilize a field of view of the camera along with a distance of the UAV 4 to the surface (e.g., using a Lidar, Leddar, sensor, barometric reading, and so on) to extrapolate location information at the centroid. Since the camera capturing imagery is likely to be at a horizontal offset from the GNSS receiver, the UAV 4 can utilize the offset when determining the centroid of the created mark (e.g., if the camera is vertically over the centroid, the offset can be subtracted or added to the coordinates).

Optionally, the UAV 4 can ensure that when creating the identifiable mark 20, the mark is created on a substantially flat surface (e.g., a distance from the surface to the UAV 4 at all points within the mark 20 are within a threshold variance of each other). In a subsequent flight plan to perform a job, if the surface is not substantially flat, a UAV implementing the subsequent flight plan can obtain imagery of the created mark 20 at different perspectives, with each perspective including a different centroid of the mark 20. For instance, of the UAV creates the identifiable mark 20 on an ant hill, a portion of the identifiable mark 20 can be hidden behind the ant hill depending on a perspective of the UAV implementing the subsequent flight plan. Consequently, the UAV 4 can utilize one or more sensors (e.g., distance sensors such as Lidar, or computer vision techniques of captured imagery during the UAV's 4 descent) to identify a substantially flat surface, and create the mark on the substantially flat surface.

Optionally, if there isn't a substantially flat surface to create the mark 20, or in implementations where the UAV does not identify substantially flat surfaces, information describing a shape of the created mark 20 can be stored by the UAV 4 in addition to location information. Imagery captured by a UAV implementing a subsequent flight plan to perform a job can therefore include the created mark 20 at different perspectives. A system (e.g., a photogrammetry system) processing the captured imagery to generate geo-rectified imagery can utilize the stored information describing a shape of the created mark 20 to extrapolate where in the image the location of the centroid is. For instance, if only a portion of the created mark 20 is visible in an image, or if the created mark 20 is distorted due to height variations of the surface, the system can utilize the shape information to determine a centroid of the created mark 20 in the image. Since the system has access to location information of the centroid, the system can accurately place the created mark in a real-world coordinate frame.

The UAV 4 can include, or be connected with, a frame that houses one or more receptacles for receiving one or more fluid containers (e.g., biodegradable spray paint canisters), which can be held in place with tension (e.g., spring tension). The UAV used with the frame ideally is a multi-copter UAV with at least 3 arms extending from the body of the UAV. The UAV may have one motor and a rotor for each arm, or a coaxial configuration with two motors each with a rotor. The frame ideally is constructed of a light weight material, such as aluminum or carbon fiber. The frame can be attached to the UAV on the body of the UAV. An actuator controlled by the UAV computer system may be used to cause the containers to release or spray fluid.

The UAV 4 can include fluid containers that dispense fluids of differing colors (e.g., colors such red, green, blue, or cyan, yellow, magenta, and black.) The fluid may be in a visible light spectrum, or non-visible light spectrum (such as ultra-violet, or infra-red). The UAV 4 may create identifiable marks 20 of differing colors, enabling a subsequent UAV flight to capture imagery and easily identify the marks 20 (e.g., the UAV 4 can store information describing the created mark, such as color, pattern, and so on, along with recording location information). As an example, marks 20 with a threshold distance of each other can be created with different colors, enabling an outside system (e.g., a photogrammetry system) to easily distinguish between the marks 20. The UAV 4 (e.g., the UAV primary processing system 600) can trigger each fluid container to create the identifiable mark 20 (e.g., as described above). Optionally, the UAV 4 each fluid container can be connected with actuators, which the UAV 4 can trigger to create the identifiable mark 20. Furthermore, as will be described, a UAV performing a subsequent flight can spray a solvent (e.g., water, non-toxic biodegradable solution) to disperse, remove, and so on, any created mark 20. The UAV can utilize the recorded location information to travel to each created mark 20 (e.g., at a safe altitude), descend towards the created mark 20, and dispense the solvent.

In a second embodiment, the UAV 4 can carry a physical marker 22 (e.g., a thin circular puck, a square object, a rectangular object, and so on), and drop the marker 22 on the surface from a threshold distance above the surface while hovering, or descend all the way to the surface, and deposit the marker while not hovering. To determine location information of a centroid of the marker 22, the UAV 4 can utilize an offset from a center of a claw, magnet, such as an elector-magnetic that can be switched on or off, or other grabbing device, or system, or alternatively from a center of the marker 22 while in flight, from the GNSS receiver, to identify location information at a centroid of the marker 22. Furthermore, as described above, the UAV 4 can capture imagery of the marker 22, and utilizing computer vision techniques, can determine a centroid of the marker 22.

Similar to the created mark 20, the UAV 4 can place the physical marker 22 on a substantially flat surface, so that the physical marker 22 is viewable from any perspective. In addition to placing the physical marker 22 on a substantially flat surface, the UAV 4 can ensure that the physical marker 22 isn't placed in water (e.g., a puddle, a pool). For instance, the UAV 4 can utilize sensors, such as infrared sensors (e.g., cameras with wavelength sensitivity of 1.5 to 1.6 micrometers, or 0.9 to 1.7 micrometers, and so on), to identify water (e.g., water can appear dark in infrared imagery). Additionally, the UAV 4 can utilize polarization information to, in part, identify water (e.g., light reflected from water can be partially linearly polarized, and polarization phases can be more similar than from other imaged areas). The UAV 4 can also utilize other computer vision techniques, such as determining features and local descriptors associated with water, and then identifying water using the computer vision techniques. Additionally, as will be described, the physical marker 22 can include a display (e.g., an LED panel, one or more lights, a display screen, and so on) such that the physical marker 22 can display one or more patterns which are recognizable to the UAV 4. Similar to the created mark 20, the physical marker 22 can display different LED patterns when within threshold distances of other physical markers 22. For example, patterns can include particular color patterns, shapes, numbers, letters, objects, figures, and so on. In this way, during a subsequent flight, the physical marker 22 will be recognizable in captured images. Additionally, each placed physical marker 22 can be later retrieved by a UAV. That is, the UAV can travel to the location of each physical marker 22, and retrieve the physical maker (e.g., the UAV can utilize a claw, a magnet, and so on), to remove the physical marker. Additionally, multiple UAVs can act in concert, with each UAV retrieving one or more physical markers. Optionally, the UAV retrieving physical markers can be larger in size, or be specially equipped, such that the UAV can retrieve multiple physical markers in a single flight.

As described above, the physical mark 22 is, in some implementations, preferably placed on a substantially flat surface (e.g., a surface which includes height variances less than a threshold). To ensure that the physical marker 22 is placed on a substantially flat surface, the UAV 4 utilize one or more sensors that can measure distance (e.g., Lidar, Leddar) and can determine a particular surface to place the physical marker 22. As an example, the UAV 4 can measure distances from the surface to the UAV 4 (e.g., while hovering at a same altitude) at a threshold number of locations (e.g., 3, 4, and so on) included in the surface, and determine whether the measurements are within a threshold variance of each other. The threshold number of locations can be included in a polygonal shape of the surface that conforms to a footprint of the physical marker 22. For instance, if the physical marker is a puck (e.g., as illustrated), the UAV can measure locations within an ellipse of a size at least the size of the footprint of the puck (e.g., a threshold number of locations spread around inside the ellipse). Additionally, if the UAV determines that a portion of the measured locations are substantially flat with respect to each other, while one or more other measured locations of the surface are greater than a threshold distance further, or closer, to the UAV, the UAV can move horizontally to exclude the one or more other measured locations and include the portion of locations. That is, the UAV can determine that a substantially flat surface might exist if it moves horizontally in the direction of the substantially flat measured locations.

Furthermore, after the physical marker 22 is placed on a surface, the UAV 4 can determine whether the physical marker 22 is level (e.g., substantially flat, such as substantially horizontal). The UAV 4 can determine a boundary of the physical marker 22, and utilizing one or more distance sensors (e.g., as described above), measure distances from the physical marker 22 to the UAV 4 (e.g., while hovering at a same altitude). If the UAV 4 determines that the physical marker 22 is not substantially flat (e.g., a particular portion of the physical marker 22 is higher, or lower, than other portions at greater than a threshold distance), the UAV 4 can retrieve the physical marker 22. After retrieving the physical marker 22, the UAV 4 can determine a substantially flat surface (e.g., as described above), and place the physical marker 22 (e.g., and use distance sensors to determine that the physical marker 22 is substantially flat).

Optionally, the physical marker 22 can include sensors, such as gyros, magnetic sensors (e.g., compasses), and so on, to actively determine whether the physical maker 22 is level. As will be described, the physical marker 22 can communicate with the UAV 4 (e.g., using Bluetooth), and can provide information to the UAV 4 indicating whether the physical maker 4 22 is level. The UAV 4 can retrieve the physical maker 22 upon receiving information indicating that the physical marker 22 is angled at greater than a threshold. Optionally, after the UAV 4 places the physical marker 22, the UAV 4 can hover until receiving confirmation that the physical marker 22 is level, enabling the UAV 4 to more easily retrieve the physical marker 22 should the need arise. Additionally, the physical maker 22 can include mechanical features on the bottom of the physical marker 22 that can level the physical marker 22. For instance, the physical marker can include self-actualizing legs on the bottom that can ensure the maker 22 is stable.

A size of the physical marker 22, or created mark 20 described above, (e.g., radius, width and length) can depend on an altitude at which a subsequent flight plan to perform a job will take place at. For instance, if a UAV is subsequently going to travel at a relatively high altitude from the physical marker 22 (e.g., 50 meters, 60 meters), the physical marker 22 can be larger than if the UAV is going to travel at a lesser altitude (e.g., 10 meters, 20 meters). The specific size can further depend on capabilities of a camera that will be included in the UAV performing the job. For example, the resolution of a sensor included in the camera, focal length of a lens of the camera, aperture of the lens (e.g., if the camera is focusing on an object a distance above the physical marker 22, a lens with a wider aperture will cause the physical marker 22 to be more out of focus), and so on. A user generating a flight plan to travel to waypoints associated with GCPs (e.g., as described in FIG. 2), can indicate a ground sampling distance, which in this specification identifies a lower acceptable threshold on image pixels per distance. That is, the ground sampling distance identifies that in captured imagery, only imagery which includes at least the threshold image pixels per distance (e.g., 3 pixels/cm) will be acceptable. Therefore, the user can designate the ground sampling distance and altitude at which the UAV 4 is to travel at (e.g., the safe altitude 12), and a system being utilized by the user can determine a minimum size of the physical marker 22, or created mark 20. Alternatively, the user can designate the ground sampling distance, along with one or more physical markers that are available to be utilized, and the system can determine one or more maximum altitudes at which the UAV can travel.

Optionally, the physical marker 22 can include one or more electronic components, such as sensors, to be used in actively determining a time at which the UAV 4 is directly over the physical marker 22. The physical marker can include electronic circuitry with a GNSS receiver. Once the physical marker is placed onto the surface, the physical marker may obtain a geospatial position. The physical maker may have an identifier that may be associated with the geospatial position. The geospatial position of the maker and the identifier may be transmitted wirelessly to the UAV, or to a ground control station.

Also, the physical marker may have wireless circuitry to transmit a beacon position, such as using BTLE (Bluetooth Low Energy). The marker may emit the beacon, which assists the UAV in obtaining a fix over the physical maker. The UAV may receive the beacon from the physical marker and adjust the UAV position such that the UAV hovers to a fixed position over the marker. In a near range position of the UAV in proximity to the physical maker, the UAV could detect an accuracy of at least 30 centimeters, or better. The physical maker could also have visible markings, other non-visible markings in a different light spectrum (such as ultra-violet, or infra-red) or LED lighting as discussed herein.

The physical marker can include a Bluetooth sensor that can provide information to the UAV 4 indicating when the UAV 4 is directly over a centroid of the physical marker 22. To determine when the UAV 4 is directly over the centroid, the physical marker 22 can include a laser, or other coherent optical source, that shines from the centroid, and the UAV 4 can include a reflective marker on the bottom at a location in a vertical line with a GNSS receiver. Additionally, the physical marker 22 can include sensors to determine the boundaries of the UAV 4 as it travels over the physical marker 22, and can determine when the boundaries of the UAV 4 directly surround the centroid. The UAV 4 can obtain location information at a time the physical marker 22 indicates it is over the centroid, for instance the UAV 4 can be continuously, or periodically at a high frequency, obtaining location information while traveling at a threshold distance above the physical marker 22 (e.g., the UAV 4 can move horizontally until receiving information from the physical marker 22). The UAV 4 can then compare a timestamp of when the physical marker 22 indicated the UAV 4 is over the centroid, to a timestamp associated with obtained location information. In this way, each physical marker 22 can include functionality for the UAV 4 to determine its location, allowing off the shelf UAVs the ability to obtain location information of physical markers.

Optionally, each physical marker can include sensors, receivers, associated with ultra-wideband ranging, and can actively determine distances between physical marker (e.g., sensors, receivers, can be located at a centroid of a physical marker, or an offset can be determined from the centroid). These distances can be maintained (e.g., by a cloud system as described below), such that distances between each physical marker can be stored and utilized (e.g., by a photogrammetry system). Consequently, the physical markers can be used as ground control points in images, with a combined (e.g., stitched) image utilizing scale information based on the distances between each physical marker (e.g. relative scale information, instead of precise location information, can be determined from the combined image). For example, each physical marker can transmit time-pulses of a particular width (e.g., a short time-pulse to avoid multi-path interference), such that accurate distance measurements can be made based on a time each pulse traveled between the physical markers (e.g., time-of-flight measurements can be performed between each physical marker, with clocks associated with the sensors synchronized using delay-locked loops). Optionally, each physical marker can include pattern information (e.g., as described herein) on top of the physical marker, such that the physical marker can be identified in images. Similarly, each physical marker can include a GNSS receiver (e.g., low-cost GNSS receiver), such that rough location information for the receiver can be determined. Each physical marker can then be identified in imagery using a location of a UAV that captured the imagery along with a field of view of the UAV. In this way, each physical marker can be identified, and distances between the physical markers can be determined.

A frame may be used to house the physical markers 22 carried by the UAV. The UAV used with the frame ideally is a multi-copter UAV with at least 3 arms extending from the body of the UAV. The UAV may have one motor and a rotor for each arm, or a coaxial configuration with two motors each with a rotor. The frame ideally is constructed of a light weight material, such as aluminum or carbon fiber. The frame can be attached to the UAV on the body of the UAV. An actuator controlled by the UAV computer system may be used to release a physical marker.

In a third embodiment, the UAV 4 can obtain detailed imagery of a surface at the geographic location of the GCP using a camera 24, and obtain location information of a centroid of the imagery. The UAV 4 can be trained to identify particular features (e.g., permanent features) that can opportunistically be utilized as GCPs. For instance, a manhole cover 26 is a fixed object at a geographic location, and the UAV 4 can travel to the manhole cover 26 (e.g., a user can identify the manhole cover 26 in satellite imagery, and assign the manhole cover 26 as a GCP), and determine a centroid of the manhole cover 26. A non-exhaustive list of objects, features, and so on, that can be utilized include fire hydrants, mailboxes, signs, cable boxes, fixed features placed by a governmental entity, and so on. These objects, features, and so on, can be later identified in imagery captured by a UAV implementing a subsequent flight plan to perform a job, and thus used as GCPs.

Additionally, the UAV 4 can descend towards the surface, and determine whether the surface includes sufficient identifying features, such that the features can be resolved by a camera included in a UAV performing a subsequent flight plan associated with a job. For instance, the UAV 4 can determine that a surface which is mainly a same color (e.g., grass, cement, and so on), will not be suitable for later identification in imagery. In this instance, the UAV 4 can determine to create an identifiable marker 20, or drop a physical marker 22. A user assigning, via the user device, geographic locations as GCPs can indicate that the UAV 4 is to prefer obtaining imagery, and if the surface does not include sufficient unique features, the UAV 4 is to create a mark, or drop a marker.

The UAV 4 can determine quality information associated with the captured imagery, and discard images that are blurry, not sharp, out of focus, and so on. Quality information about captured imagery can be determined by sharpness measurements of the image. For instance, a frequency domain analysis of the image can be performed, and a lack of high frequencies can be indicative of a lack of focus (e.g., compared to an expected inclusion of high frequencies for the image). Additionally, a laplacian kernel can be convolved with the image (e.g., in the spatial domain) and the result can be used to determine blurriness of the image (e.g., intensity values of pixels within a threshold distance can be compared, and a blurry image can have a lack of comparisons greater than a threshold). Additional quality information can include brightness measurements, exposure measurements, contrast measurements, and so on. Optionally, the UAV 4 may have onboard GPU processing capabilities to determine the quality information. The UAV 4 may after taking an image, move into a holding position, and the UAV 4 onboard processing system (e.g., described in FIG. 6) may analyze the image. If the onboard processing system determines that an image does not meet a threshold quality, the UAV can then re-take the image. The UAV processing system can rerun the image quality review process, and can then continue with the flight plan if the image passes the quality threshold. Furthermore, the UAV 4 can provide the captured imagery to a user device of an associated operator for review (e.g., over a wireless connection), and the operator can confirm or deny that the imagery is acceptable.

In the above embodiments in which the UAV 4 hovers while performing an action, the UAV 4 can measure wind affecting the UAV 4 (e.g., using one or more movement sensors such as accelerometers, rotational sensors, and so on, or one or more sensors that measure wind speed), and based on the measured wind, the UAV 4 can wait to create a mark, or drop a physical marker, until a lull in the wind is determined. For instance, the UAV 4 can determine that if the measure is less than a threshold (e.g., the wind is causing the UAV to not move more than a threshold horizontal and/or vertical distance, such that the UAV can remain stable, or the wind speed is less than a threshold), then the UAV 4 can place the physical marker. If the wind begins to negatively affect the UAV 4 while its creating a mark, the UAV 4 can pause the creation while it gets moved around, and can return to creating the mark when the wind causes the UAV 4 to remain substantially stable (e.g., not move in a direction more than a threshold distance). The UAV 4 can monitor its precise location (e.g., using a RTK receiver, or by visually tracking a surface the UAV 4 is directly over, and use computer vision techniques as feedback loops), and when a lull in the wind is detected, move to the precise location at which it started creating the mark.

Figure 1D:
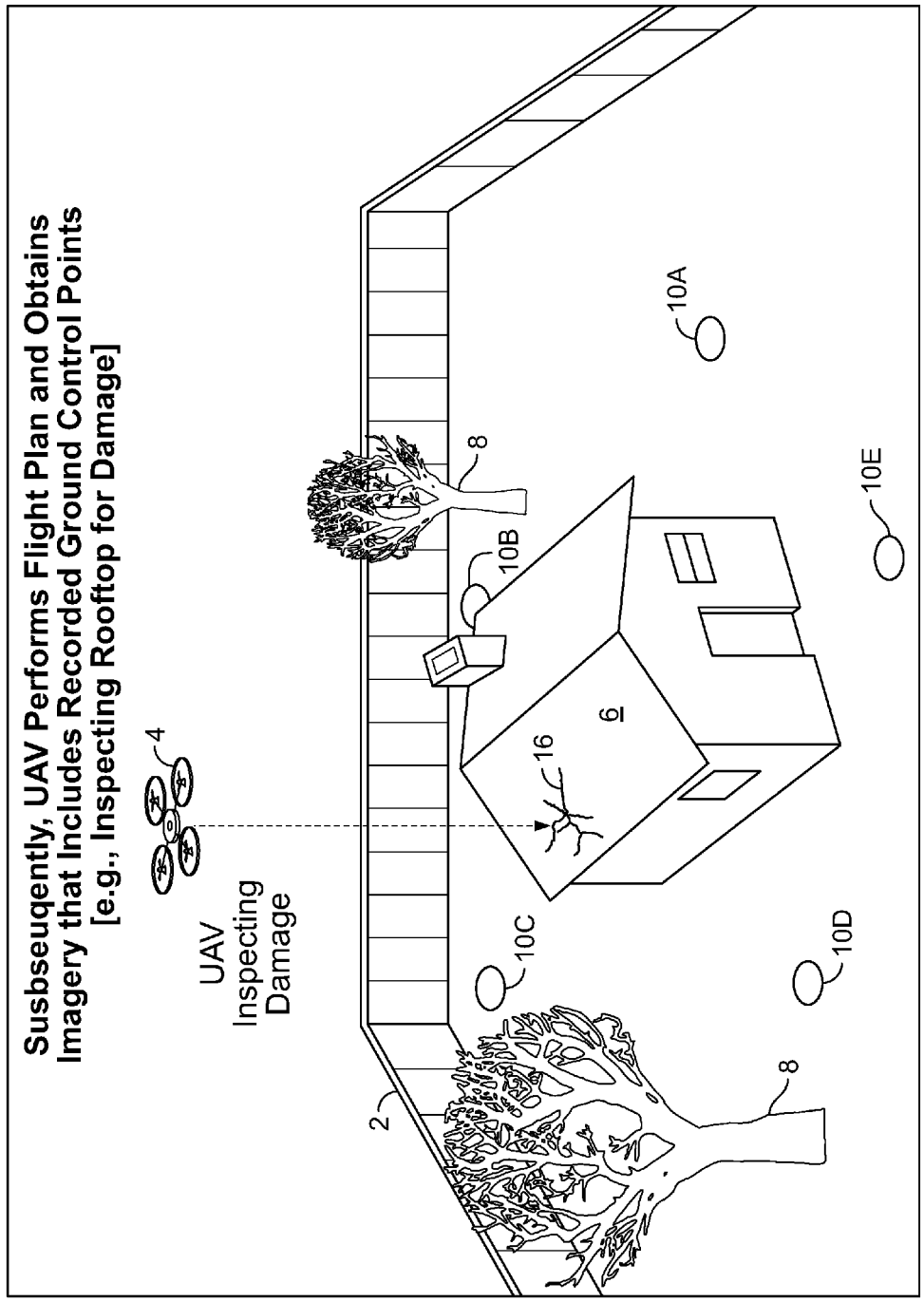
FIG. 1D illustrates an example diagram of a UAV implementing a flight to perform a job.

FIG. 1D illustrates an example diagram of a UAV 4 implementing a flight to perform a job. As illustrated, subsequent to the UAV 4 traveling to each waypoint associated with a GCP, a flight plan to perform a particular job can be implemented (e.g., by the same UAV 4, or a different UAV). In FIG. 1D, the UAV 4 is inspecting a rooftop of the house 6, and identifying damage (e.g., weather damage) to the rooftop. As illustrated, the UAV 4 has identified a portion 16 of the rooftop of the house 6 as being damaged, and is descending towards the portion 16 while capturing imagery. Since the inspection area includes geographic locations that have been designated as GCPs (e.g., sprayed with a fluid, a marker has been deposited on the geographic location), the captured imagery can include one or more GCPs. In this way, the captured imagery can be geo-rectified, and precise coordinate information can be obtained.

Figure 2:
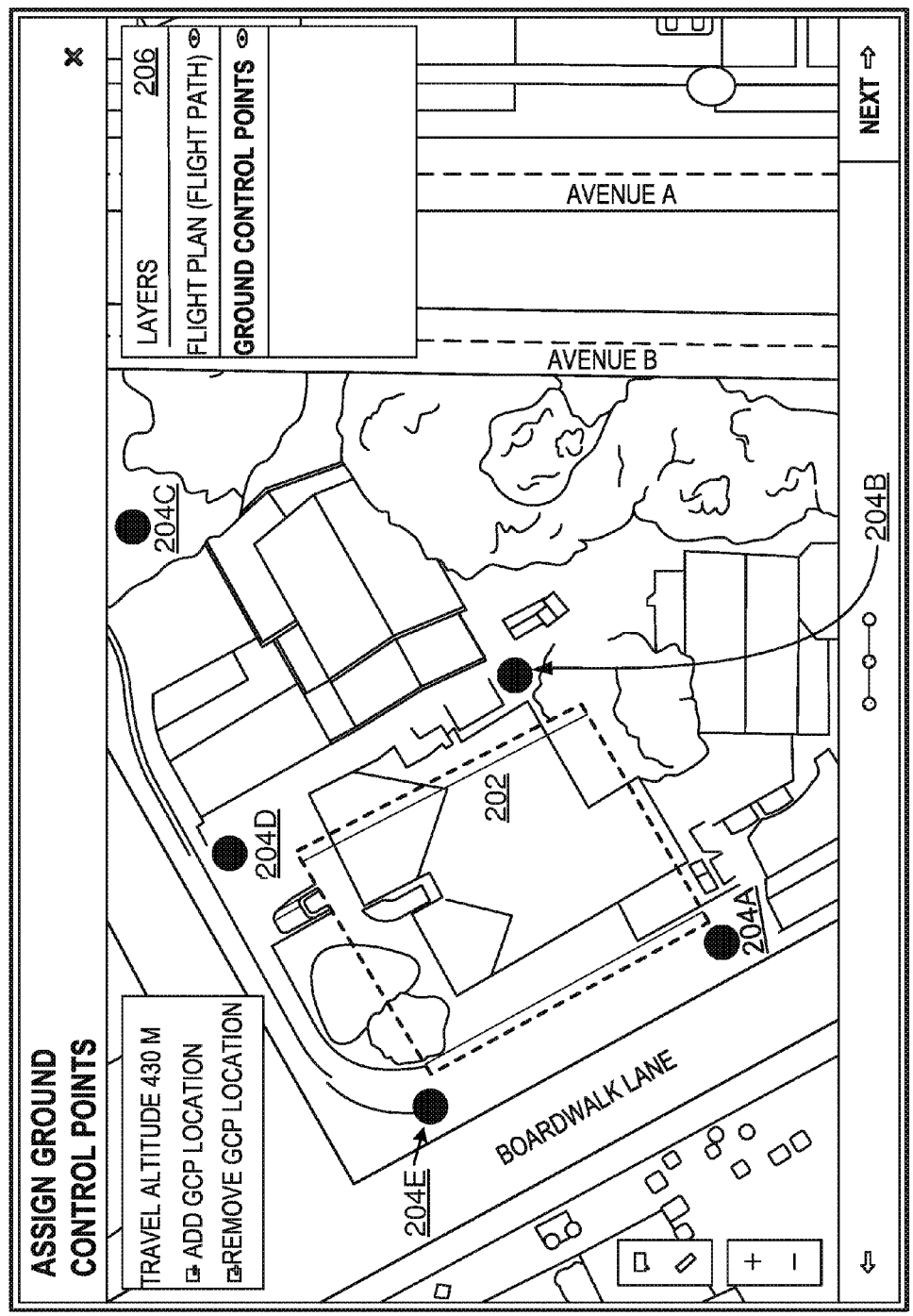
FIG. 2 illustrates an example user interface for assigning ground control points (GCPs) to geographic locations illustrated in imagery (e.g., satellite imagery).

FIG. 2 illustrates an example user interface 200 for assigning ground control points (GCPs) to geographic locations illustrated in imagery (e.g., satellite imagery). The user interface 200 is an example of an interactive user interface that can be generated by a system (e.g., a cloud system as described below) for presentation on a user device of a user. The user interface 200 can be an interactive document (e.g., a web page) that the user device can receive over a network (e.g., the Internet), and render for presentation to the user. Optionally, the user interface 200 can be generated by a user device of an operator proximate to a UAV that will be implementing a generated flight plan. The user device can receive assignments of GCPs, generate a flight plan, and provide the flight plan to the UAV for implementation (e.g., live in the field).

The user interface 200 can receive location information from the user, such as a particular address of a property to be inspected, longitude and latitude coordinates, a neighborhood designation, and so on, and can present imagery (e.g., satellite imagery) that includes the location. As illustrated in user interface 200, a house 202 is illustrated, along with neighboring streets and houses. Optionally, for implementations in which a user device of an operator generates a flight plan, or modifies a generated flight plan as described in FIG. 1A-1B, the user device can obtain a present location of the user device (e.g., GNSS coordinates), and obtain imagery that includes the present location.

A user of the user interface 200 can assign GCPs to geographic locations within the presented imagery. For instance, the user has assigned geographic locations 204A-204E as being GCPs, which are graphically illustrated in the user interface 200. The user can utilize the user interface 200 to identify geographic locations that have been assigned as GCPs, and determine whether additional GCPs are to be assigned. As described above, the user can assign a greater density of GCPs to a geographic area that is proximate to an area of interest to the user. For example, as illustrated in the user interface 200, a particular house 202 is associated with a flight plan to perform a job (e.g., identifying damage to a rooftop of the house 202, with the house outlined, or otherwise highlighted, to indicate the flight plan). The user has therefore assigned geographic locations proximate to the house 202 as being GCPs, so that imagery captured of the house 202 can be properly geo-rectified. In contrast, a single GCP 204C has been assigned at the upper edge of the user interface 200 since a lesser degree of accuracy is required at the upper edge.

The user interface 200 includes user selectable layers 206, that can show a flight plan to perform a job and/or the Ground Control Points that have been assigned. In the example of FIG. 2, the flight plan has not been selected by the user, whereas the presently assigned GCPs layer has been selected. The user can therefore view the geographic locations assigned as GCPs. The user can interact with the layers 206 to show the flight plan to perform the job, and view waypoints, a flight path between waypoints, and so on, that are associated with performing the job. In this way the user can utilize the user interface 200 to ensure that sufficient GCPs have been assigned.

While the GCPs may be selected by a user, the ground control station software, or a cloud-based system, may automatically designate ground control points. The ground control station and cloud-based system may analyze an image of where an inspection will be performed. For example, these systems may have an application program or software, that analyzes the images for appropriate locations of a GCP. Ideal locations would be sidewalks, driveways or other detectable surfaces. These surfaces may be detected based on known object detection techniques. Ideally, the ground control point will be placed a location that is within a field of view of a UAV sensor while the UAV is conducting an inspection. The systems may calculate a field of view area based on a field of view of a image sensor, such as a digital camera, and an altitude of where the UAV will be conducting an inspection. The system may select multiple ground control point locations around, or within the field of view area. The ground control point locations may be presented via a user interface. The ground control points locations may optionally be moveable to another location. For example, the system may analyze an image, and determine one or more suitable locations to place ground control points. A ground control point may be selected on a concrete sidewalk next to a rooftop of a structure being selected. A user of the system may select the ground control point and move it to a different location. Additionally, the automatically generated ground control points may optionally be deleted by a user input. These automatically generated ground control points may be transmitted to a UAV as discussed herein. Also, the system may determine areas where a ground control point can not be placed. For example, the system may detect based on a color analysis that a body of water, such as a pool or pond exists within the field of view or inspection area. The system would avoid placing a ground control points in these detected locations. The system may optionally be configured such that a user of the system may not be able to place a ground control point in these detected locations. Based on object detection, or colors of portions of the image, the system may be able to detectable usable or non-usable locations for placement of ground control points.

Each geographic location assigned as a GCP can be set as a particular waypoint (e.g., as described above) for a UAV to travel to and designate the geographic location as a GCP (e.g., mark the geographic location). In addition to setting waypoints, the user can interact with the user interface 200 to indicate a type of action the UAV is to perform at each waypoint (e.g., creating a marker, dropping a marker, obtaining detailed imagery). The user interface 200 can access information describing capabilities of UAVs that are available to be used (e.g., at a particular time and/or geographic area), and can present only types of actions that are possible with the capabilities of the UAVs (e.g., the user may not have access to UAVs that can create markers). Furthermore, the user can designate a waypoint transition speed between each waypoint, and an altitude (e.g., a safe altitude) at which a UAV is to travel at between waypoints.

After entering GCP assignments, the user can interact with the user interface 200 to generate a flight plan to be provided to a UAV to implement traveling to each geographic location assigned as a GCP (e.g., as described above). A system (e.g., a cloud system) can generate a flight plan, which can be provided to a user device of an operator for transmission to the UAV, or to the UAV (e.g., over a wireless or wired connection).

Optionally, the flight plan can include both a flight plan to designate geographic locations as GCPs, but also the flight plan to perform the job. In this way, the same UAV can perform both flight plans, with the performance of the job immediately following the designation of GCPs. Optionally, the flight plans can be coordinated such that, the UAV can designate GCPs in a particular geographic area, and perform the flight plan associated with the job in that same geographic area. Subsequently, the UAV can travel to a different geographic area and repeat the process. In this way, for flight plans that involve a large geographic area, the overall time for completion can be shortened.

Optionally, the flight plan to designate geographic locations as GCPs can be performed by a first UAV, and a second UAV can perform the job after the first. As described above, for particular flight plans that include a large geographic area, the second UAV can perform the flight plan associated with the job in a particular geographic area subsequent to the first UAV designating GCPs in the particular geographic area.

Figure 3:
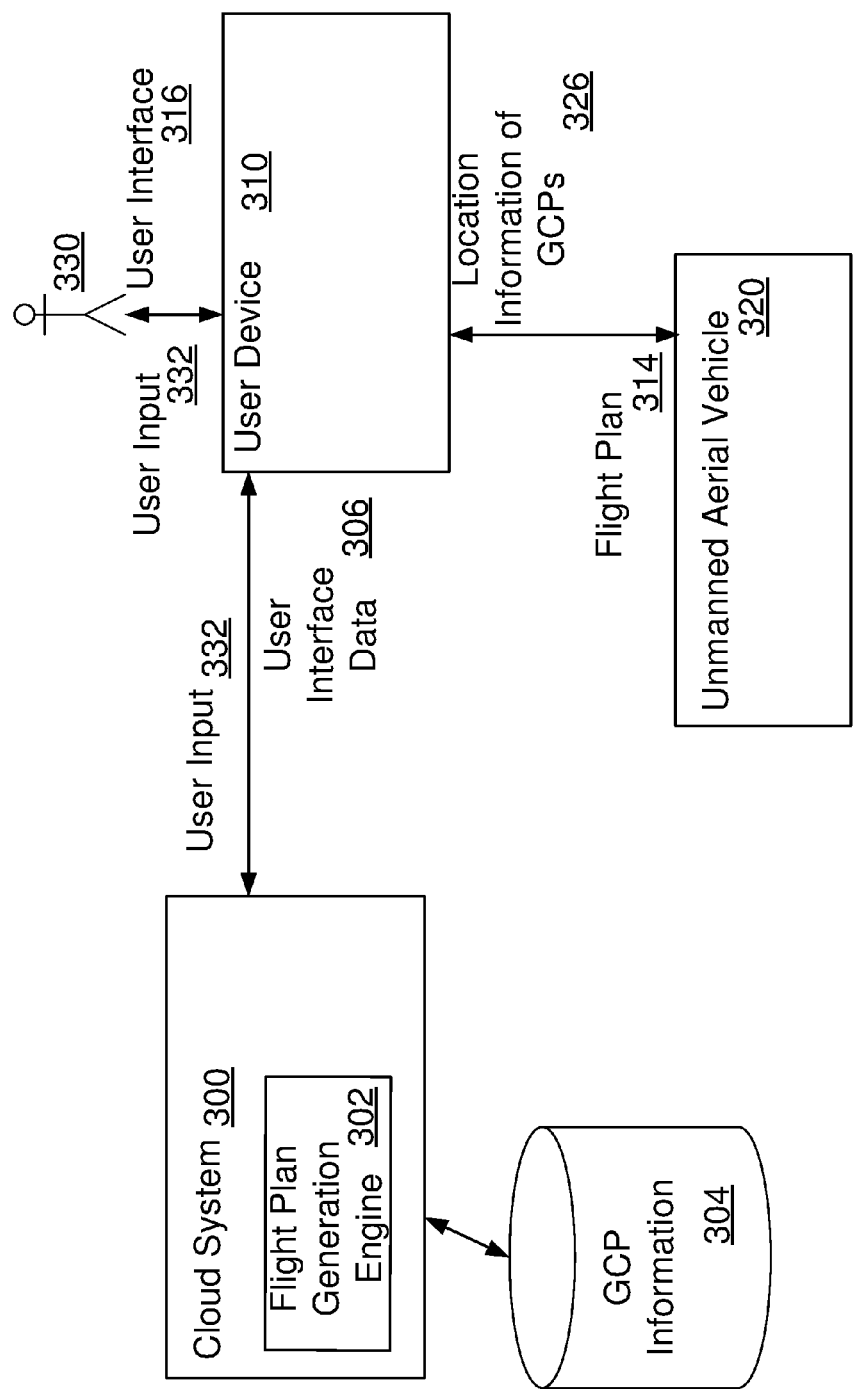
FIG. 3 illustrates a block diagram of an example cloud system.

FIG. 3 illustrates a block diagram of an example cloud system 300. The cloud system 300 can be a system of one or more computers, or software executing on a system of one or more computers. The cloud system 300 can generate flight plans 314 to be implemented by an unmanned aerial vehicle (UAV) to designate geographic locations as ground control points (GCPs), and obtain accurate location information (e.g., GPS coordinates), of each designated geographic location.

The cloud system 300 includes a flight plan generation engine 302 that can generate user interface data 306 for presentation on a user device 310 (e.g., user interface 200 described above with respect to FIG. 2) as user interfaces 316 configured to receive assignments of geographic locations as GCPs. For instance, a user 330 can provide user input 332 to a user interface 316 to indicate a location at which a flight plan is to take place (e.g., an address), and the user device 310, or cloud system 300, can obtain imagery (e.g., satellite imagery) of the location. The user 330 can then interact with the user interface 316 to assign particular geographic locations included in the imagery as GCPs. Subsequently, the flight planning generation engine 302 can generate a flight plan 314 for a UAV 320 to implement. The cloud system 300 can provide the flight plan 314 to the UAV 320, or alternatively a user device (e.g., user device 310, or a user device of an operator positioned proximate to the entered location) can receive the flight plan 314, and provide the flight plan 314 to the UAV 320. Optionally, the flight plan generating engine 302 can analyze geographic locations assigned by the user 330 (e.g. determine whether the placements should be modified), and/or can determine geographic locations to be assigned as GCPs. The flight plan generation engine 302 can, for example, determine that GCPs are to evenly be distributed in the indicated location (e.g., the engine 302 can determine that an even distribution provides the greatest accuracy). Additionally, the flight plan generation engine 302 can obtain information describing heights of a surface (e.g., the ground) in the indicated location (e.g., the information can be a topological map, a 3D model, a terrain model), and can determine that additional GCPs are to be included in portions of the location with greater than a threshold height variance. The engine 302 can receive (e.g., from the user 330) a minimum accuracy required, and can utilize the minimum accuracy to inform a minimum number of GCPs that are to be included in the location. Similarly, to maintain the minimum accuracy in portions of the location in which heights of the surface vary with greater than a threshold variance, the engine 302 can determine that more GCPs are to be included (e.g., based on the minimum accuracy and particular height variances). The engine 302 can optionally receive a maximum number of GCPs that can be created in the location (e.g., a maximum number of physical markers can be used), and can determine locations to place the GCPs (e.g., based on height information as described above) that will provide the greatest accuracy.

As described above, the UAV 320 can travel to waypoints associated with geographic locations assigned as GCPs, and perform actions at each waypoint to designate the geographic location as a GCP (e.g., mark the geographic location), and obtain accurate location information at the designated geographic location (e.g., location information at a centroid of the designated geographic location). The location information 326 can be provided to the user device 310 (e.g., user device of an operator), and the cloud system 300 can receive the location information 326 and store the information 326 in one or more databases 304.

In this way, imagery captured during a subsequent flight plan of a UAV to perform a job (e.g., an inspection of a property or structure for damage) at the entered location can be utilized in conjunction with the stored location information 304 to generate geo-rectified imagery.

Figure 4:
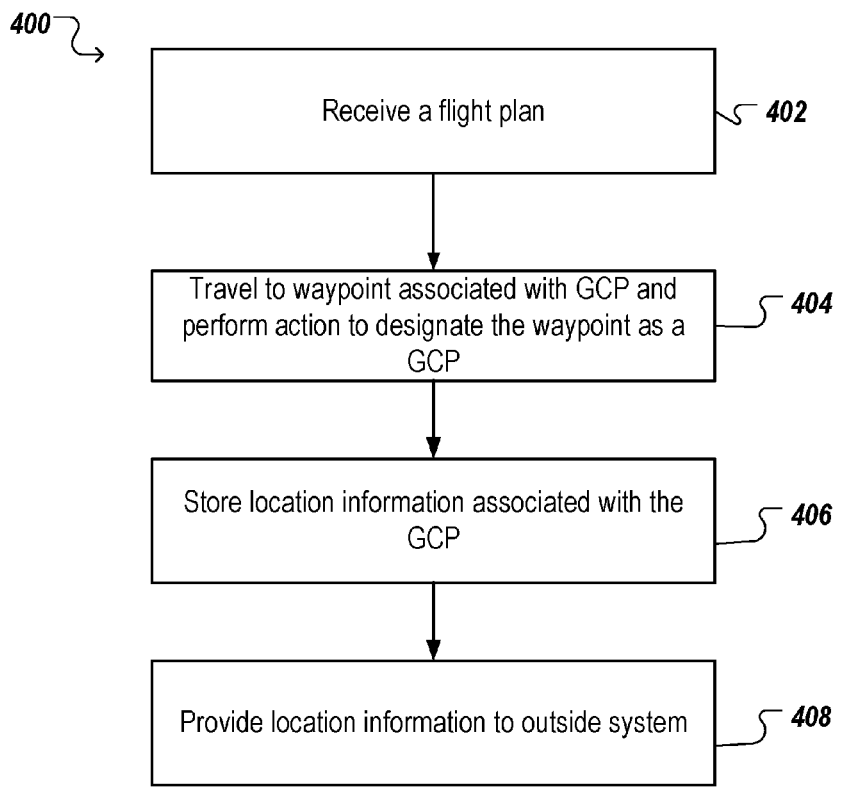
FIG. 4 is a flowchart of an example process to designate real-world geographic locations as ground control points, and obtain location information at the designated geographic locations.

FIG. 4 is a flowchart of an example process 400 to designate real-world geographic locations as ground control points, and obtain location information at the designated geographic locations. For convenience, the process 400 will be described as being performed by an unmanned aerial vehicle (UAV) that includes one or more processors (e.g., an unmanned aerial vehicle implementing the primary processing system 600).

The UAV receives a flight plan (block 402). As described above, a user can assign geographic locations as ground control points (GCPs), and a flight plan can be generated with each assigned geographic location being associated with a waypoint the UAV is to travel to. The UAV can receive the flight plan from an operator (e.g. a human operator in communication with the UAV over a wired or wireless connection who is proximate to the UAV), or from a cloud system that generates flight plans (e.g., the cloud system 300).

The UAV travels to an initial waypoint associated with a GCP (block 404). The UAV obtains information identifying a geographic location associated with the waypoint (e.g., GPS coordinates), and travels to the waypoint. As illustrated in FIG. 1A, the UAV can travel at a particular altitude (e.g., a safe altitude) indicated in the received flight plan that is safe for the UAV to travel at within an inspection area indicated in the flight plan. The UAV can travel to the waypoint at a particular speed indicated in the flight plan, and upon reaching vertically above the initial waypoint, can descend towards the waypoint.

The UAV descends to a surface at a geographic location associated with the waypoint, and performs an action to designate the geographic location as a GCP. After traveling to the waypoint, the UAV descends in a vertical line towards the surface (e.g., towards the ground, towards a surface of a structure or property, and so on). After descending to a threshold distance above the surface, the UAV performs an action to designate the geographic area as being a GCP.

Optionally, the UAV can land on the surface, so as place a marker as described above, with reference to FIG. 1C.

The UAV performs an action according to information indicated in the received flight plan, and as illustrated in FIG. 1C, the UAV can create an identifiable marker by spraying a fluid on the surface, the UAV can place, or drop, a physical marker on the surface, or the UAV can obtain detailed imagery of the surface (e.g., a manhole cover).

The UAV obtains, and stores, location information associated with the designated geographic area (block 406). As described above, with reference to FIG. 1C, the UAV obtains location information (e.g., GNSS coordinates) at a centroid of the designated geographic area. The UAV stores the location information, and optionally can provide the location information to a user device of an operator (e.g., over a wireless connection).

The UAV provides the location information to a system for storage (block 408). Subsequent to the UV traveling to each waypoint, the UAV provides the location information, and optionally captured imagery of designated geographic locations as described in FIG. 1C, to an outside system (e.g., the cloud system 300) for storage. The location information can be utilized when generating ortho-rectified or geo-rectified imagery from images that include geographic locations designated as GCPs.

Figure 5A:
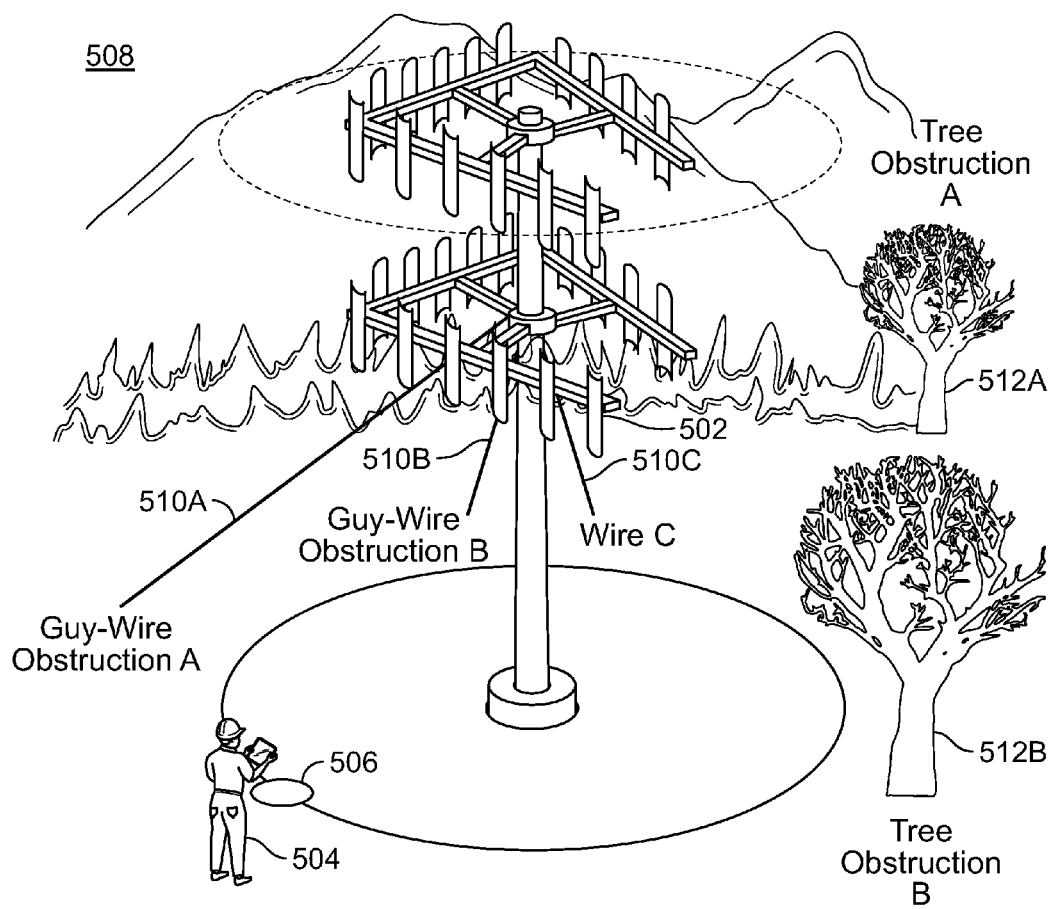
FIGS. 5A-B illustrate example diagrams of an addition embodiment of designating geographic locations as GCPs, and obtaining location information associated with the designated geographic locations.
Figure 5B:
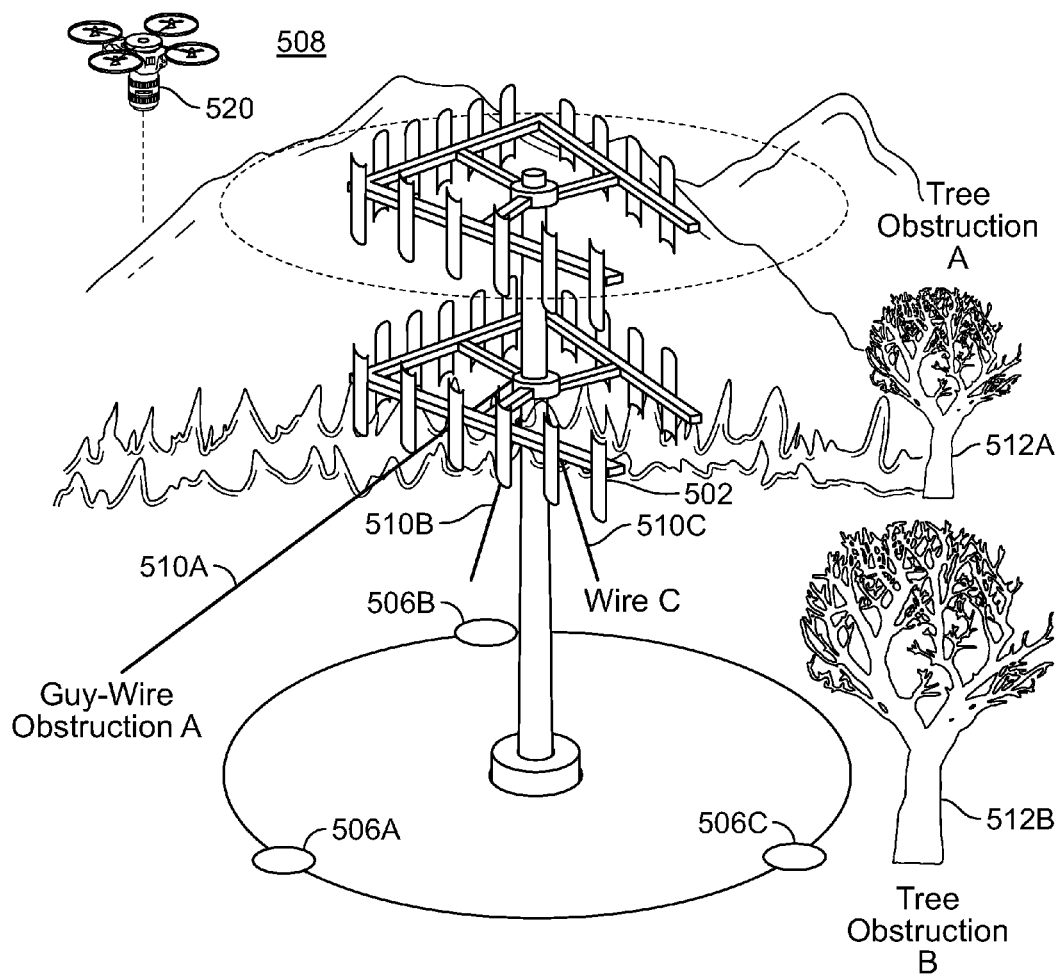

FIGS. 5A-B illustrate example diagrams of an addition embodiment of designating geographic locations as GCPs, and obtaining location information associated with the designated geographic locations. As described above, with reference to FIGS. 1A-1D, a flight plan can be generated that includes waypoints associated with geographic locations assigned as GCPs. A user can assign geographic locations as GCPs, where the geographic locations can, in some implementations, be safely descended to from a high altitude (e.g., there no obstructions that will interfere with the UAV). To assign GCPs, the user can view imagery (e.g., satellite imagery) and identify geographic locations free of obstructions. Additionally, an operator that travels to with the UAV can visually determine whether obstructions exist, and update the flight plan to move one or more geographic locations.

In the Example of FIGS. 5A-5B, geographic locations can be assigned as GCPs, and a UAV can obtain location information associated with each geographic location without descending towards the surface.

FIG. 5A illustrates a vertical structure 502 (e.g., a cell tower) that is connected with several guy-wires (e.g., guy-wires 510A-510C) to a surface (e.g., the ground), and is proximate to several trees (e.g., trees 512 A-512 B). Each guy-wire can be of a thickness that would make the guy-wire difficult to see in satellite imagery, and a user assigning geographic locations as GCPs might assign a geographic location as being under, or too near, a guy-wire. Therefore, operator 504 can travel to the inspection area 508, and place physical markers 506 at geographic locations in the inspection area 508. That is, the operator 504 can determine geographic locations to place GCPs, walk around and place on a surface the physical markers 506 at the determined geographic locations. Optionally, a UAV can drop physical markers as it travels at a particular altitude (e.g., a safe altitude as described in FIG. 1A), and optionally record location information of each dropped physical marker. For instance, in large open clearings, it can be faster for a UAV to drop physical markers from the altitude if the risk of humans being in danger of being hit by a physical marker is low.

FIG. 5B illustrates an example diagram of a UAV 520 obtaining location information associated with placed physical markers (e.g., physical markers 506A-506C). The UAV 520 travels at a particular altitude (e.g., a safe altitude as described in FIG. 1A) towards a physical marker (e.g., physical marker 506A).

When the operator places physical markers, the operator can optionally obtain location information (e.g., GNSS coordinates from a consumer grade GNSS receiver) that indicates an approximate location of each physical marker. The UAV 520 can obtain information describing the approximate locations of the physical markers, and set each approximate location as a waypoint to travel to. The UAV 520 can therefore travel at the particular altitude until reaching the approximate area, and can identify a physical marker 506A using a camera included in, or connected to, the UAV 520. Optionally, the UAV 520 can store information describing the physical marker, including a shape, color, pattern (e.g., created using an active display visible on the physical marker as described above), and so on, and use the information to identify the physical marker.

Alternatively, the UAV 520 can travel within the inspection area 508, and identify physical markers within the inspection area. To increase a speed at which the UAV can identify physical markers, the UAV 520 can travel at a maximum altitude that still enables the UAV 520 to identify a physical marker on the surface. For instance, the maximum altitude can be based on an acceptable ground sampling distance (e.g., an acceptable number of pixels per distance) for one or more visual recognition algorithms that can identify physical markers. Since the ground sampling distance depends on capabilities of the camera (e.g., sensor size, sensor resolution, and so on as described above), a UAV with a better camera (e.g., greater resolution), can travel at a higher altitude to identify physical markers.

The UAV 520 travels to a physical marker 506A, and hovers vertically over the physical marker 506A. As described above, with respect to FIG. 1C, the UAV 520 can determine a centroid of the physical marker 506A using a camera and information describing a shape, and/or color or pattern, of the physical marker 506A, and can obtain location information at the centroid. Similar to FIG. 1C, the obtained location information can be modified by an offset defined by a difference between a horizontal difference in the center of the camera and a location receiver (e.g., GNSS receiver).

Optionally, the physical marker 506A can include, at the centroid, an area that is reflective to particular wavelengths of electromagnetic radiation. The UAV 520 can activate a sensor that provides electromagnetic radiation, and maneuver the UAV 520 to increase a received signal reflected from the physical marker 506A. In this way, the UAV 520 can accurately determine when it's located substantially over the centroid of the physical marker 506A (e.g., within a threshold distance of a precise centroid). Since the sensor is likely to not be in a purely vertical line with the location receiver, the obtained location information can be modified by a horizontal difference in the sensor and the location receiver.

The UAV 520 travels vertically over each physical marker, and obtains location information. Subsequently, the UAV 520, or a different UAV, can perform a subsequent flight plan to perform a job. For instance, the vertical structure 502 can be inspected, and captured imagery of the vertical structure 502 can include the physical markers 506A-506C.

UAVs Acting in Concert

The above description includes methods and systems to designate geographic locations as GCPs, and obtain location information of the designated geographic locations. As described in FIG. 2, a first UAV and a second UAV can act in concert, with the first UAV designating GCPs, and the second UAV implementing a flight plan to perform a job. Optionally, the first UAV can include an identifiable marker facing vertically upwards, and act as a GCP in imagery captured by the second UAV flying above the first UAV. For instance, the first UAV can include a display (e.g., an LED panel, one or more visual, infrared, ultraviolet, lights, and so on) utilized to display particular shapes, numbers, letters, and so on.

As described in FIG. 2, the first and second UAVs can receive flight plans, with the first UAV implementing a flight plan to travel to geographic locations assigned as GCPs, and the second UAV implementing a flight plan to perform a job (e.g., inspecting an area for damage). The first UAV can be positioned lower than the second UAV, and the second UAV can capture imagery of the first UAV for use as a GCP. Optionally, both UAVs may be manually operated, or operated based on flight plans in communication with each other, with the first UAV flown to and landing at a first location, and the second UAV flown above the first UAV to obtain images of the first UAV at a surface level The first UAV and second UAV can act in concert (e.g., the first UAV can be in communication with the second UAV), such that the first UAV is always included in captured imagery of the second UAV. For instance, the second UAV can provide information to the first UAV indicating that it's no longer visible by second UAV (e.g., no longer included in captured imagery), and the first UAV can hover in place until the second UAV can see it or is located directly over the first UAV, or can travel to a location which is viewable by the second UAV. Additionally, the second UAV can provide its present location along a flight path to the first UAV, and the first UAV can ensure that it's below the second UAV. Additionally, the first UAV can provide information to the second UAV indicating a location (e.g., geospatial location indicated by GNSS coordinates) at which the first UAV is to travel. The second UAV can then travel (e.g., navigate) to the location at an altitude a threshold distance above the first UAV (e.g., the first UAV can land on a surface), and capture imagery that includes the first UAV.

The first UAV can record its location when it is at a location to be used as a ground control point, and can associate the recorded locations with timestamps. When captured imagery is taken from the second UAV after performance of the job, an outside system (e.g., a photogrammetry system), can correlate timestamps associated with the first UAVs recorded locations with timestamps of when the second UAV captured images. In this way, the outside system can determine that, for a particular image captured by the second UAV, the first UAV visible in the image was located at a particular location.

However, since GCPs are generally assumed to be fixed on a surface (e.g., the ground) of a real-world coordinate frame, if the first UAV is not substantially close to the surface in each image, the outside system can improperly generate ortho-rectified or geo-rectified imagery. Therefore, a projection from the first UAVs location in 3-D space can be made to a location vertically down on the surface (e.g., the ground). That is, a location on the surface can be determined that is vertically below the first UAVs position in each captured image by the second UAV. Optionally, the first UAV can land on the surface, and the second UAV can position itself directly over the first UAV and record location information. The first UAV may transmit its geospatial location to the second UAV, and the second UAV use the location position, and at an altitude over the first UAV. An operator may use a ground control station to control both UAVs. The first UAV may transmit its geospatial position to the ground control station, and the ground control station may transmit the first UAV position to the second UAV, and cause the second UAV to navigate to a position, and at an altitude over the first UAV.

To effect this projection, the first UAV can additionally monitor, and record, altitude information at each timestamp associated with recording location information. The first UAV can utilize a distance sensor (e.g., a Lidar sensor, a Leddar sensor, barometric sensor) to accurately determine its distance from the surface. The outside system can utilize the distance, along with perspective information included in each image (e.g., determined from a field of view of a camera of the second UAV), to determine the projection.

In this way, the outside system can fix the first UAV to the surface, and properly generate geo-rectified or ortho-rectified imagery.

In a simpler manner, the first UAV can communicate geospatial information (e.g., GNSS coordinates) at which the first UAV is to travel. The second UAV can then travel to the location indicated by the received geospatial information, such that the first and second UAV can be substantially in a vertical direction Similarly, a vehicle can drive around within an inspection area that includes a location receiver (e.g., a GNSS receiver), and a visually identifiable mark on top. A UAV implementing a flight plan to perform a job can capture imagery that includes the vehicle, and an outside system can utilize the vehicle as a GCP in each image.

GCP Proxies

Known locations of fixed features can be utilized as GCPs while a UAV implements a flight plan to perform a job. For instance, if the UAV is determining damage (e.g., weather damage) to the rooftop of the house, a GCP can be the corners of the property boundaries, or parcel that includes the house, if sufficiently accurate data for the corners can be obtained. Similarly, manhole covers, fire hydrants, and so on, can be utilized as GCPs if their locations have been previously determined.

Figure 6:
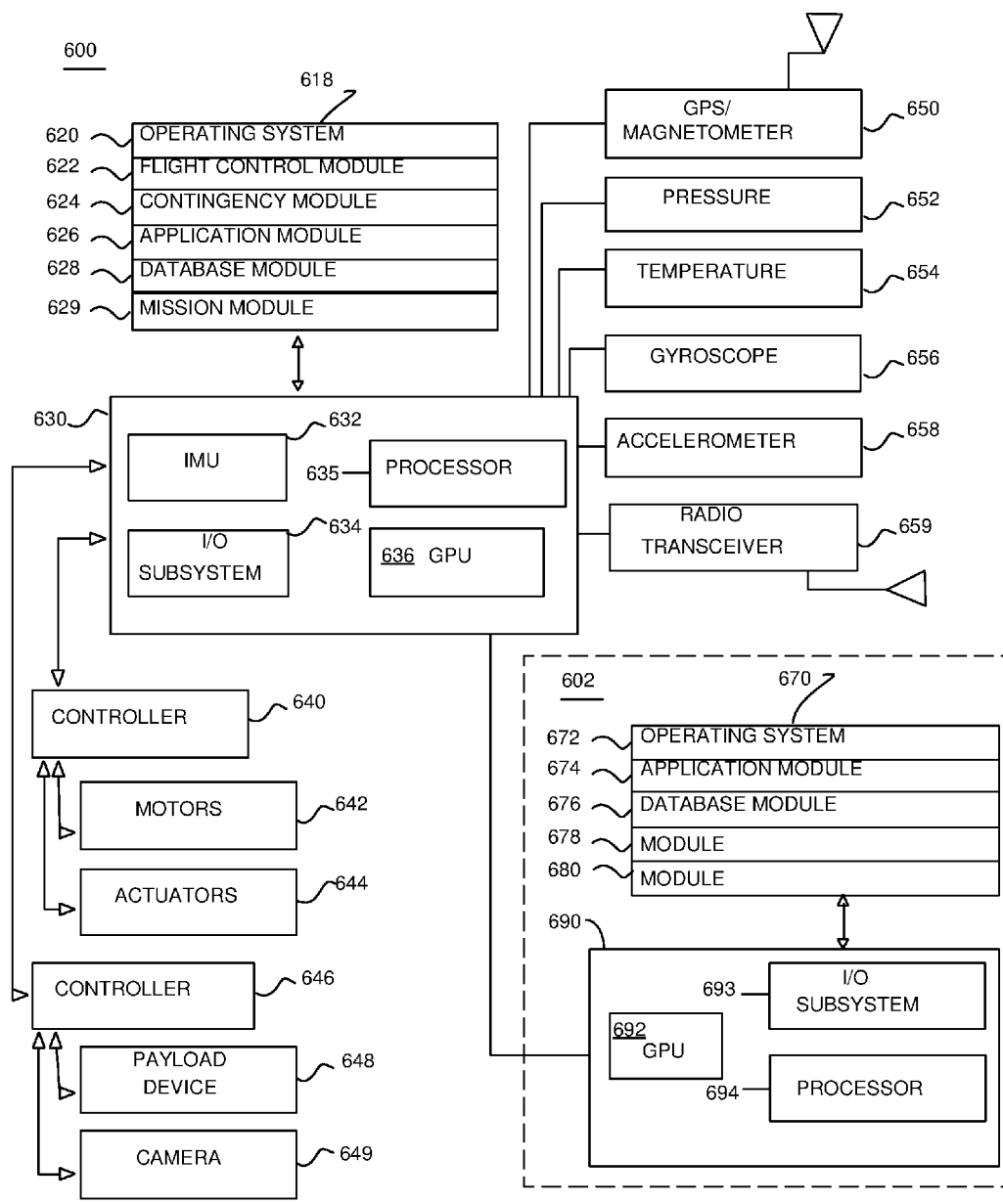
FIG. 6 illustrates a block diagram of an example UAV architecture for implementing the features and processes described herein.

FIG. 6 illustrates a block diagram of an example Unmanned Aerial Vehicle (UAV) architecture for implementing the features and processes described herein. A UAV primary processing system 600 can be a system of one or more computers, or software executing on a system of one or more computers, which is in communication with, or maintains, one or more databases. The UAV primary processing system 600 can be a system of one or more processors 635, graphics processors 636, I/O subsystem 634, logic circuits, analog circuits, associated volatile and/or non-volatile memory, associated input/output data ports, power ports, etc., and/or one or more software processing executing one or more processors or computers. Memory 618 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GPS receivers 650, gyroscopes 656, accelerometers 658, temperature sensors 654, pressure sensors (static or differential) 652, current sensors, voltage sensors, magnetometer, hydrometer, and motor sensors. The UAV may use an inertial measurement unit (IMU) 632 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 600 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module (also referred to as flight control engine) 622 handles flight control operations of the UAV. The module interacts with one or more controllers 640 that control operation of motors 642 and/or actuators 644. For example, the motors may be used for rotation of propellers, and the actuators may be used for flight surface control such as ailerons, rudders, flaps, landing gear, and parachute deployment.

The contingency module 624 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 629 processes the flight plan, waypoints, and other associated information with the flight plan. The mission module 629 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 649, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 618 of the UAV processing system 600.

The UAV processing system 600 may be coupled to various radios, and transmitters 659 for manual control of the UAV, and for wireless or wired data transmission to and from the UAV primary processing system 600, and optionally the UAV secondary processing system 602. The UAV may use one or more communications subsystems, such as a wireless communication or wired subsystem, to facilitate communication to and from the UAV. Wireless communication subsystems may include radio transceivers, and infrared, optical ultrasonic, electromagnetic devices. Wired communication systems may include ports such as Ethernet, USB ports, serial ports, or other types of port to establish a wired connection to the UAV with other devices, such as a ground control system, cloud-based system, or other devices, for example a mobile phone, tablet, personal computer, display monitor, other other network-enabled devices. The UAV may use a light-weight tethered wire to a ground control station for communication with the UAV. The tethered wire may be removeably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the cloud system.

Modules, programs or instructions for performing flight operations, contingency maneuvers, and other functions may be performed with the operating system. In some implementations, the operating system 620 can be a real time operating system (RTOS), UNIX, LINUX, OS X, WINDOWS, ANDROID or other operating system. Additionally, other software modules and applications may run on the operating system, such as a flight control module 622, contingency module 624, application module 626, and database module 628. Typically flight critical functions will be performed using the UAV processing system 600. Operating system 620 may include instructions for handling basic system services and for performing hardware dependent tasks.

In addition to the UAV primary processing system 600, a secondary processing system 602 may be used to run another operating system to perform other functions. A UAV secondary processing system 602 can be a system of one or more computers, or software executing on a system of one or more computers, which is in communication with, or maintains, one or more databases. The UAV secondary processing system 602 can be a system of one or more processors 694, graphics processors 692, I/O subsystem 693 logic circuits, analog circuits, associated volatile and/or non-volatile memory, associated input/output data ports, power ports, etc., and/or one or more software processing executing one or more processors or computers. Memory 670 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 602 will be non-critical functions in nature, that is if the function fails, the UAV will still be able to safely operate. In some implementations, the operating system 672 can be based on real time operating system (RTOS), UNIX, LINUX, OS X, WINDOWS, ANDROID or other operating system. Additionally, other software modules and applications may run on the operating system 672, such as an application module 674, database module 676, and so on (e.g., modules 678-680). Operating system 602 may include instructions for handling basic system services and for performing hardware dependent tasks.

Also, controllers 646 may be used to interact and operate a payload device 648, and other devices such as photographic camera 649, video camera, infra-red camera, multispectral camera, stereo camera pair, Lidar, radio transceiver, sonar, laser ranger, altimeter, TCAS (traffic collision avoidance system), ADS-B (Automatic dependent surveillance—broadcast) transponder. Optionally, the secondary processing system 602 may have coupled controllers to control payload devices.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A ground control point marker comprising:
    a top portion having a pattern thereon, the pattern configured to be recognizable in aerial images obtained by an unmanned aerial vehicle;
    a Global Navigation Satellite System (GNSS) receiver, wherein the GNSS receiver obtains geospatial position information of a location where the ground control point marker is placed on a ground surface; and
    a transmitter configured to wirelessly transmit the geospatial position information and an identifier of the ground control point marker to a separate computer system
    wherein the top portion comprises a display with a plurality of lights, wherein the display is configured to display the pattern, and wherein the pattern comprises variable shapes, numbers, letters or figures.

2. The ground control point marker of claim 1, wherein a shape of the ground control point marker is circular, square or rectangular.

3. The ground control point marker of claim 1, wherein the display comprises an LED panel.

4. The ground control point marker of claim 1, wherein the ground control point marker determines a distance to different ground control point markers, and in response to the distance being less than a threshold distance, the ground control point marker displays a pattern different from a pattern displayed on the different ground control point markers.

5. The ground control point marker of claim 1, further comprising:
    one or more sensors configured to determine information associated with the ground control point marker being level.

6. A method comprising:
    placing a plurality of ground control point markers on a ground surface, each ground control point marker comprising:
        a top portion having a pattern thereon, the pattern configured to be recognizable in aerial images obtained by an unmanned aerial vehicle;
        a Global Navigation Satellite System (GNSS) receiver, wherein the GNSS receiver obtains geospatial position information of a location where the ground control point marker is placed on a ground surface; and
        a transmitter configured to wirelessly transmit the geospatial position information and an identifier of the ground control point marker to a separate computer system,
        wherein for at least one ground control point market, the top portion comprises a display configured to display the pattern, and wherein the pattern comprises variable shapes, numbers, letters or figures;
    obtaining by the respective ground control point markers their respective geospatial position information; and
    transmitting the respective geospatial position information and identifiers of each of the ground control point markers to a separate computer system.

7. The method of claim 6, further comprising:
    obtaining aerial images including images of the plurality of the ground control point markers; and
    generating ortho-rectified imagery of the obtained aerial images using the geospatial position information of the ground control point markers.

8. The method of claim 6, wherein a shape of a particular ground control point marker of the plurality of ground control point markers is circular, square or rectangular.

9. The method of claim 6, wherein the pattern of a respective ground control marker is of a different pattern from the other ground control markers.

10. The method of claim 6, wherein the display of the at least one ground control point marker comprises an LED panel.

11. The method of claim 6, wherein a particular ground control point marker determines a distance to different ground control point markers, and in response to the distance being less than a threshold distance, the particular ground control point marker displays a pattern different from a pattern displayed on the different ground control point markers.

12. The method of claim 6, wherein each ground control point marker further comprises:
    one or more sensors configured to determine information associated with the ground control point marker being level.

13. An unmanned aerial vehicle (UAV) system comprising:
    an unmanned aerial vehicle (UAV) comprising one or more processors, the UAV configured to:
        place a ground control point marker on a surface, the ground control point marker being usable as a ground control point; and
    the ground control point marker, the ground control point marker comprising:

an upper portion having a pattern thereon, the pattern being recognizable from an aerial view, a Global Navigation Satellite System (GNSS) receiver, wherein the GNSS receiver obtains location information of the ground control point marker, and a transmitter configured to receive the location information from the GNSS receiver and wirelessly transmit the location to the UAV, wherein the upper portion comprises a display configured to display the pattern, and wherein the pattern comprises variable shapes, numbers, letters or figures.

14. The system of claim 13, wherein the UAV is further configured to:

carry the ground control point marker to a waypoint;
descend towards the surface; and
place the ground control point marker on the surface at the waypoint.

15. The system of claim 13, wherein the UAV is further configured to:

determine a level surface on which the UAV is to be placed; and
place the ground control point marker on the level surface.

16. The system of claim 13, wherein the UAV is further configured to:
receive information, from the ground control point marker, indicating that the ground control point marker is on a level surface, and wherein the ground control point marker further comprises:

one or more sensors configured to determine information associated with the ground control point marker being level.

17. An unmanned aerial vehicle (UAV) system comprising:

an unmanned aerial vehicle (UAV) comprising one or more processors, the UAV configured to:

place a ground control point marker on a surface,
determine, using a Global Navigation Satellite System (GNSS) receiver of the UAV, location information associated with the ground control point marker, and provide the determined location information to an outside system for storage as being associated with a ground control point; and the ground control point marker, the ground control point marker comprising:

an upper portion having a pattern thereon, the pattern being recognizable from an aerial view,
wherein the upper portion comprises a display configured to display the pattern, and wherein the pattern comprises variable shapes, numbers, letters or figures.

18. The system of claim 17, wherein determining location information associated with the ground control point marker comprises:

navigating over the ground control point marker, and while navigating, receiving information indicating that the UAV is over a centroid of the ground control point marker, wherein the ground control point marker determines, using one or more sensors, a time at which the UAV is over the centroid; and recording a timestamp associated with receiving the information.

19. The system of claim 18, wherein the UAV obtains location information of the UAV while navigating over the ground control point marker, and wherein the UAV determines location information of the centroid of the ground control point marker based on the recorded timestamp.

20. The system of claim 17, wherein the UAV is further configured to:

carry the ground control point marker to a waypoint;
descend towards the surface; and
place the ground control point marker on the surface at the waypoint.

21. The system of claim 17, wherein the UAV comprises a Global Navigation Satellite System receiver, and wherein the receiver comprises a Real Time Kinetic (RTK) receiver or a Post Processing Kinetic (PPK) receiver.

* * * * *